United States Patent
Arai et al.

(10) Patent No.: US 10,131,962 B2
(45) Date of Patent: Nov. 20, 2018

(54) SEAMLESS STEEL PIPE AND METHOD FOR PRODUCING SAME

(71) Applicant: NIPPON STEEL & SUMITOMO METAL CORPORATION, Tokyo (JP)

(72) Inventors: Yuji Arai, Amagasaki (JP); Kenji Kobayashi, Nishinomiya (JP); Hiroyuki Nagayama, Osaka (JP)

(73) Assignee: NIPPON STEEL & SUMITOMO METAL CORPORATION, Tokyo (JP)

( * ) Notice: Subject to any disclaimer, the term of this patent is extended or adjusted under 35 U.S.C. 154(b) by 66 days.

(21) Appl. No.: 14/423,480

(22) PCT Filed: Aug. 28, 2013

(86) PCT No.: PCT/JP2013/073048
§ 371 (c)(1),
(2) Date: Feb. 24, 2015

(87) PCT Pub. No.: WO2014/034737
PCT Pub. Date: Mar. 6, 2014

(65) Prior Publication Data
US 2015/0315685 A1    Nov. 5, 2015

(30) Foreign Application Priority Data
Aug. 29, 2012 (JP) .................. 2012-188634

(51) Int. Cl.
*C21D 1/18* (2006.01)
*C21D 8/10* (2006.01)
(Continued)

(52) U.S. Cl.
CPC ............... *C21D 1/18* (2013.01); *C21D 6/002* (2013.01); *C21D 6/004* (2013.01); *C21D 6/005* (2013.01);
(Continued)

(58) Field of Classification Search
CPC .... C21D 1/18; C21D 2211/004; C21D 6/002; C21D 6/004; C21D 6/005; C21D 6/008;
(Continued)

(56) References Cited

U.S. PATENT DOCUMENTS
6,264,760 B1   7/2001  Tamehiro et al.

FOREIGN PATENT DOCUMENTS
CN   1628183   6/2005
CN   1806062   7/2006
(Continued)

OTHER PUBLICATIONS

Thelning, K. "Steel and its heat treatment" 1984. via ASM Handbooks: R.N. Penha, L.C.F. Canale, J. Vatavuk and S. Lampman, Tempering of Steels, Steel Heat Treating Fundamentals and Processes. vol. 4A, ASM Handbook, ASM International, 2013, p. 327-351. (Year: 1994).*

(Continued)

*Primary Examiner* — Colleen P Dunn
*Assistant Examiner* — Nicholas A Wang
(74) *Attorney, Agent, or Firm* — Clark & Brody

(57) ABSTRACT

A seamless steel pipe has a carbon equivalent Ceq of 0.50% to 0.58%, and contains specified carbides containing Mo at a ratio of 50 mass % or more, V, and at least one selected from the group consisting of Ti and Nb, and having a size of 20 nm or more.

6 Claims, 5 Drawing Sheets

(51) Int. Cl.
| | | |
|---|---|---|
| *C21D 6/00* | (2006.01) | |
| *F16L 9/02* | (2006.01) | |
| *C21D 9/08* | (2006.01) | |
| *C22C 38/38* | (2006.01) | |
| *C22C 38/58* | (2006.01) | |
| *C22C 38/00* | (2006.01) | |
| *C22C 38/02* | (2006.01) | |
| *C22C 38/04* | (2006.01) | |
| *C22C 38/06* | (2006.01) | |
| *C22C 38/20* | (2006.01) | |
| *C22C 38/22* | (2006.01) | |
| *C22C 38/24* | (2006.01) | |
| *C22C 38/26* | (2006.01) | |
| *C22C 38/28* | (2006.01) | |
| *C22C 38/42* | (2006.01) | |
| *C22C 38/44* | (2006.01) | |
| *C22C 38/46* | (2006.01) | |
| *C22C 38/48* | (2006.01) | |
| *C22C 38/50* | (2006.01) | |

(52) U.S. Cl.
CPC ............... *C21D 6/008* (2013.01); *C21D 8/10* (2013.01); *C21D 8/105* (2013.01); *C21D 9/08* (2013.01); *C21D 9/085* (2013.01); *C22C 38/001* (2013.01); *C22C 38/002* (2013.01); *C22C 38/02* (2013.01); *C22C 38/04* (2013.01); *C22C 38/06* (2013.01); *C22C 38/20* (2013.01); *C22C 38/22* (2013.01); *C22C 38/24* (2013.01); *C22C 38/26* (2013.01); *C22C 38/28* (2013.01); *C22C 38/38* (2013.01); *C22C 38/42* (2013.01); *C22C 38/44* (2013.01); *C22C 38/46* (2013.01); *C22C 38/48* (2013.01); *C22C 38/50* (2013.01); *C22C 38/58* (2013.01); *F16L 9/02* (2013.01); *C21D 2211/004* (2013.01)

(58) Field of Classification Search
CPC ............ C21D 8/10; C21D 8/105; C21D 9/08; C21D 9/085; C22C 38/001; C22C 38/002; C22C 38/02; C22C 38/04; C22C 38/06
See application file for complete search history.

(56) References Cited

FOREIGN PATENT DOCUMENTS

| | | |
|---|---|---|
| CN | 101151387 | 3/2008 |
| CN | 101855378 | 10/2010 |
| CN | 102224268 | 10/2011 |
| EP | 1 918 397 | 5/2008 |
| EP | 1 918 400 | 5/2008 |
| JP | 2004-124158 | 4/2004 |
| JP | 2010-024504 | 2/2010 |
| JP | WO2011152240 * | 8/2011 |
| JP | WO2011152240 * | 12/2011 |
| WO | 2007/023805 | 3/2007 |
| WO | 2011/114896 | 9/2011 |
| WO | 2011/152240 | 12/2011 |

OTHER PUBLICATIONS

Chinese Office Action for Application No. 201380056252.X, dated Mar. 17, 2016.
Extended European Search Report for Application No. 13832808.3, dated Apr. 11, 2016.
Chinese Office Action for Application No. 201380056252.X, dated Oct. 19, 2016, with its English translation.
Office Action for Canadian application No. 2,882,8431 dated Mar. 8, 2018.

* cited by examiner ature patent SEAMLESS STEEL PIPE AND METHOD FOR PRODUCING SAME

TECHNICAL FIELD OF THE INVENTION

The present invention relates to a seamless steel pipe and a method for producing the same and, more specifically, to a seamless steel pipe suitable for a line pipe and a method for producing the same.

Priority is claimed on Japanese Patent Application No. 2012-188634, filed on Aug. 29, 2012, the content of which is incorporated herein by reference.

RELATED ART

In recent years, oil wells and gas wells in a sour environment, represented by the deep sea or cold districts, severer than the conventional environment have been in development. The offshore pipeline laid in such a severe sour environment is required to have strength (pressure resistance) and toughness higher than conventional ones and is further required to have resistance to hydrogen induced cracking (HIC resistance).

For the offshore pipeline, which is required to have such properties, a seamless steel pipe is more suitable than a welded steel pipe. This is because the welded steel pipe has a weld zone (seam portion) along the longitudinal direction. The weld zone has a toughness lower than that of a base metal. Therefore, the seamless steel pipe is suitable for the offshore pipeline.

When the thickness of the seamless steel pipe is increased, high pressure resistance can be obtained. However, the increase in thickness easily causes a brittle fracture and decreases the toughness. In order to improve the strength and toughness for the thick seamless steel pipe, it is necessary to increase the amount of alloying elements such as carbon to improve the hardenability. However, in the case where the seamless steel pipes having improved hardenability are joined to each other by circumferential welding, the heat affected zone is likely to harden, and the toughness and HIC resistance of the circumferential weld zone are decreased.

In Patent Documents 1 to 3, there are disclosed seamless steel pipes for line pipe having improved strength and toughness and methods for producing the same.

In the seamless steel pipe for line pipe disclosed in Patent Document 1, it is described that a product of a Mn content and a Mo content is 0.8 to 2.6 and thus the strength and the toughness are increased. Further, the seamless steel pipe for line pipe disclosed in Patent Document 1 contains at least one of Ca and rare earth metals (REM), and thus the SSC resistance is increased.

The seamless steel pipe for line pipe disclosed in Patent Document 2 has a metallographic structure mainly composed of bainite and has cementite having a length of 20 μm or less. In Patent Document 2, it is described that even when the pipe is formed to be thick, high strength, good toughness, and good corrosion resistance can be obtained.

In the seamless steel pipe disclosed in Patent Document 3, it is described that the number of oxide-based inclusions present in the steel and having a diameter larger than 300 μm is one or less per square centimeter and the number of oxide-based inclusions having a diameter of 5 μm to 300 μm is 200 or less per square centimeter. In Patent Document 3, it is described that when the number of oxide-based inclusions is limited as described above, the embrittlement at the grain boundary is suppressed and thus the toughness of the seamless steel pipe can be increased.

PRIOR ART DOCUMENT

Patent Document

[Patent Document 1] PCT International Publication No. WO 2007/023804
[Patent Document 2] PCT International Publication No. WO 2007/023806
[Patent Document 3] Japanese Unexamined Patent Application, First Publication No. 2004-124158

DISCLOSURE OF THE INVENTION

Problems to be Solved by the Invention

However, when the strength of the seamless steel pipes disclosed in Patent Documents 1 to 3 is X80 or more according to the API standards, that is, the yield strength of the seamless steel pipe is 550 MPa or more, the HIC resistance may decrease.

Further, when the seamless steel pipes disclosed in Patent Documents 1 to 3 are circumferentially welded on the spot, the hardness of a heat affected zone (HAZ) among the circumferential weld zones, particularly, a fusion line (bond portion), is increased and thus the HIC resistance is decreased in some cases.

An object of the present invention is to provide to a seamless steel pipe suitable for a line pipe having high strength and excellent HIC resistance, and having excellent HIC resistance of HAZ even when being circumferentially welded.

Means for Solving the Problem (1) According to an aspect of the present invention, there is provided a seamless steel pipe including, as a chemical composition, by mass %, C: 0.02% to 0.10%, Si: 0.05% to 0.5%, Mn: 1.0% to 2.0%, Mo: 0.5% to 1.0%, Cr: 0.1% to 1.0%, Al: 0.01% to 0.10%, P: 0.03% or less, S: 0.005% or less, Ca: 0.0005% to 0.005%, V: 0.010% to 0.040%, N: 0.002% to 0.007%, at least one selected from the group consisting of Ti: 0.008% or less and Nb: 0.02% to 0.05%, and a balance consisting of Fe and impurities, in which a carbon equivalent Ceq defined by the following Formula (a) is 0.50% to 0.58%, and specified carbides containing Mo at a ratio of 50 mass % or more, V, and at least one selected from the group consisting of Ti and Nb, and having a size defined by an average value of major axes of 20 nm or more are contained.

$$Ceq=C+Mn/6+(Cr+Mo+V)/5+(Ni+Cu)/15 \qquad (a)$$

here, into each of the symbols of elements in Formula (a), the amount of a unit mass % of a corresponding element is substituted, and in the case where an element corresponding to the symbol of the element is not contained, "0" is substituted into the corresponding symbol of the element.

(2) The seamless steel pipe according to (1) may further include at least one selected from the group consisting of Cu: 1.0% or less and Ni: 1.0% or less in place of some of Fe.

(3) In the seamless steel pipe according to (1) or (2), the yield strength may be 550 MPa or more and a Vickers hardness at a position on an inner side 1 mm away from an inner surface may be 248 HV10 or less.

(4) The seamless steel pipe according to any one of (1) to (3) may be produced by a process including a quenching and a tempering at 660° C. to 700° C.

(5) According to another aspect of the present invention, there is provided a method for producing a seamless steel pipe including heating a steel material including, as a chemical composition, by mass %, C: 0.02% to 0.10%, Si: 0.05% to 0.5%, Mn: 1.0% to 2.0%, Mo: 0.5% to 1.0%, Cr: 0.1% to 1.0%, Al: 0.01% to 0.10%, P: 0.03% or less, S: 0.005% or less, Ca: 0.0005% to 0.005%, V: 0.010% to 0.040%, N: 0.002% to 0.007%, at least one selected from the group consisting of Ti: 0.008% or less and Nb: 0.02% to 0.05%, and a balance consisting of Fe and impurities and having a carbon equivalent Ceq defined by the following Formula (b) of 0.50% to 0.58%, producing a raw pipe by piercing-rolling the heated steel material, producing a seamless steel pipe by rolling the raw pipe, quenching the seamless steel pipe at a quenching temperature of an $A_{c3}$ point or higher, and tempering the seamless steel pipe after the quenching at a tempering temperature of 660° C. to 700° C.

$$Ceq=C+Mn/6+(Cr+Mo+V)/5+(Ni+Cu)/15 \quad (b)$$

here, into each of the symbols of elements in the Formula (b), the amount (mass %) of the corresponding element is substituted, and in the case where an element corresponding to the symbol of the element is not contained, "0" is substituted into the corresponding symbol of the element.

(6) The method for producing a seamless steel pipe according to (5) may further include acceleratedly cooling the seamless steel pipe at a cooling rate of 100° C./min or higher until a temperature of the seamless steel pipe reaches a temperature of an $A_{r1}$ point or lower between the producing of the seamless steel pipe and the quenching of the seamless steel pipe, and the acceleratedly-cooled seamless steel pipe may be quenched in the quenching of the seamless steel pipe.

(7) In the method for producing a seamless steel pipe according to (5) or (6), the seamless steel pipe may further include, as the chemical composition, at least one selected from the group consisting of Cu: 1.0% or less and Ni: 1.0% or less in place of some of Fe.

Effects of the Invention

The above-described seamless steel pipe has high strength and excellent HIC resistance and has excellent HIC resistance of HAZ even when being circumferentially welded.

EMBODIMENT OF THE INVENTION

Figure 1:
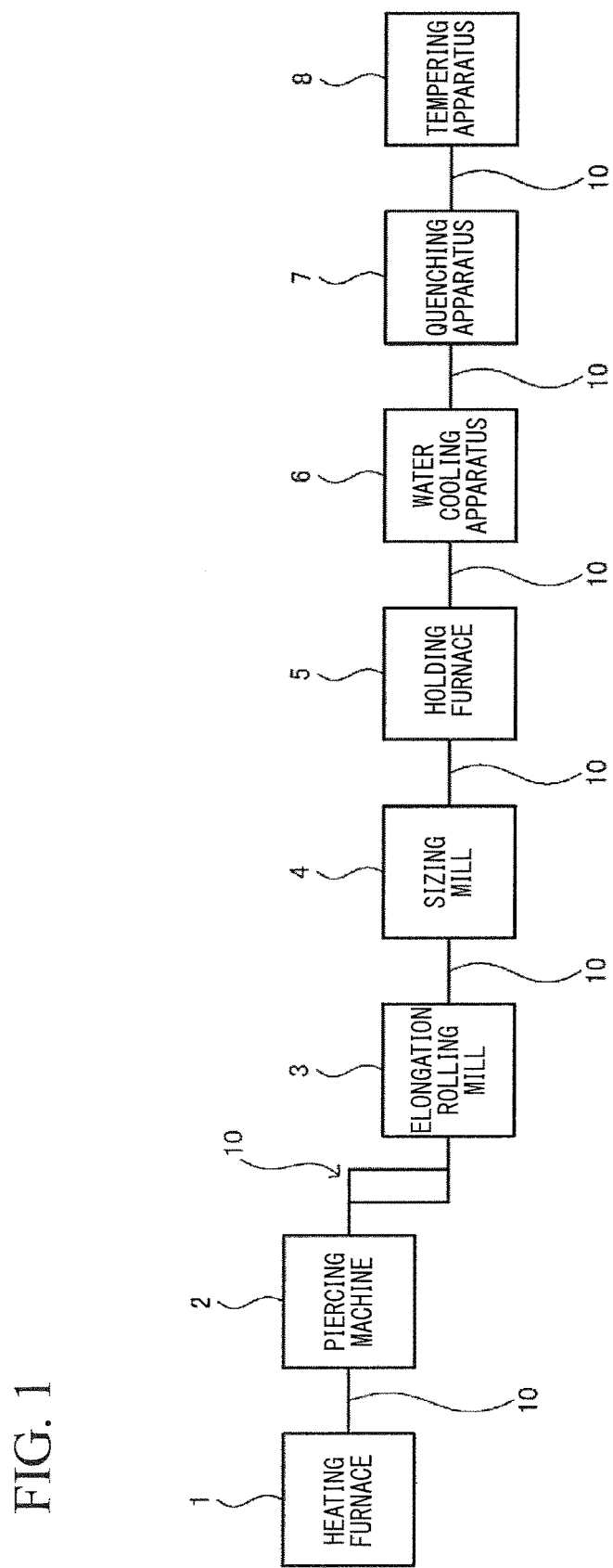
FIG. 1 is a block diagram of a production line of a seamless steel pipe according to the present embodiment.

Hereinafter, an embodiment of the present invention will be described in detail with reference to the accompanying drawings. In the drawings, the same symbols are applied to the same or equivalent portions, and the explanation thereof is not repeated.

The present inventors researched and examined the strength and HIC resistance of the seamless steel pipe. As a result, the present inventors obtained the following findings.

(A) When the strength of steel is increased, a C content may be increased. However, when the C content is too high, the hardness of the steel becomes too high and the HIC resistance is decreased. Particularly, when the seamless steel pipe is subjected to circumferential welding, the hardness of HAZ including a fusion line is increased and the HIC resistance of the HAZ is decreased. Accordingly, it is preferable to limit the C content to 0.02% to 0.10%.

(B) When the C content is low, high strength is not easily obtained. Here, in the embodiment, a carbon equivalent Ceq expressed by the following Formula (1) is 0.50% to 0.58%.

$$Ceq=C+Mn/6+(Cr+Mo+V)/5+(Ni+Cu)/15 \quad (1)$$

Here, into each of the symbols of elements in Formula (1), the amount (mass %) of each element is substituted, and in the case where an element corresponding to the symbol of the element is not contained, "0" is substituted into the corresponding symbol of the element.

In a case of a carbon equivalent Ceq of 0.50% to 0.58%, even when the C content is within the above-described range, a yield strength of 550 MPa or more is obtained. Further, even when circumferential welding is carried out, the hardness of the HAZ is not increased excessively. Therefore, excellent HIC resistance of the HAZ can be maintained.

(C) In order to obtain high strength and excellent HIC resistance, it is effective that a plurality of specified carbides is contained in the seamless steel pipe. Here, the specified carbides referred to herein represent carbides containing Mo as a main component, V, and at least one of Ti and Nb.

It is preferable that the size of the specified carbide is 20 nm or more. When the size of the specified carbide is too small, the hardness of the steel becomes too high and the HIC resistance is decreased. It is important to set the size of the specified carbide to 20 nm or more in order to increase the HIC resistance by controlling the hardness of the steel to fall in an appropriate range. Further, when the size of the specified carbide is 20 nm or more, the hardness of the HAZ of the circumferentially welded seamless steel pipes is not likely to increase excessively and also the HIC resistance of the HAZ can be maintained.

(D) In order to produce the above-described seamless steel pipe, it is effective to quench and temper the seamless steel pipe. In the tempering, it is preferable that the tempering temperature is 660° C. to 700° C. Accordingly, the size of the specified carbide becomes 20 nm or more.

The seamless steel pipe according to the embodiment completed based on the above findings and the method for producing the same will be described.

[Chemical Composition]

The seamless steel pipe according to this embodiment has the following chemical composition.

C: 0.02% to 0.10%

Carbon (C) increases the strength of the steel. When the C content is less than 0.02%, the above-described effect cannot be obtained sufficiently. On the other hand, when the C content is more than 0.10%, the toughness of the circumferential weld zone of the seamless steel pipe is decreased. Therefore, the C content is 0.02% to 0.10%. The lower limit of the C content is preferably more than 0.02%, and more preferably 0.04%. The upper limit of the C content is preferably 0.08%.

Si: 0.05% to 0.5%

Silicon (Si) deoxidizes the steel. When the Si content is 0.05% or more, the above-described effect can be obtained remarkably. However, when the Si content is more than 0.5%, the toughness of the steel is decreased. Accordingly, the upper limit of the Si content is 0.5%. The lower limit of the Si content is preferably more than 0.05%, more preferably 0.08%, and still more preferably 0.10%. The upper limit of the Si content is preferably less than 0.5%, more preferably 0.25%, and still more preferably 0.20%.

Mn: 1.0% to 2.0%

Manganese (Mn) improves the hardenability of the steel, and increases the strength of the steel. When the Mn content is less than 1.0%, the above-described effect is not easily effectively obtained and a yield strength of a grade of X80 or higher is not easily obtained. On the other hand, when the Mn content is more than 2.0%, Mn segregates in steel, and resultantly the toughness of a heat affected zone (HAZ) formed by circumferential welding and the toughness of the seamless steel pipe itself (base metal) are decreased. Accordingly, the Mn content is 1.0% to 2.0%. The lower limit of the Mn content is preferably more than 1.0%, more preferably 1.3%, and still more preferably 1.4%. The upper limit of the Mn content is less than 2.0%, more preferably 1.8%, and still more preferably 1.6%.

Mo: 0.5% to 1.0%

Molybdenum (Mo) improves the hardenability of the steel and increases the strength of the steel. Further, Mo combines with C and V in the steel to form fine specified carbides containing at least one of Ti and Nb which will be described later. As long as the size of the specified carbide is 20 nm or more, a high strength can be stably obtained. In addition, even when heat treatment is carried out after circumferential welding, the specified carbides are not easily coarsened. Thus, even when the size of the specified carbide is 20 nm or more, the strength of the steel can be maintained. The specified carbides will be described later. When the Mo content is less than 0.5%, the above-described effect is not easily obtained. On the other hand, when the Mo content is more than 1.0%, the weldability and the HAZ toughness of the steel are decreased. Accordingly, the Mo content is 0.5% to 1.0%. The lower limit of the Mo content is preferably more than 0.5%, more preferably 0.6%, and still more preferably 0.7%. The upper limit of the Mo content is preferably less than 1.0%, more preferably 0.9%, and still more preferably 0.8%.

Cr: 0.1% to 1.0%

Chromium (Cr) improves the hardenability of the steel and increases the strength of the steel. Cr further improves the temper softening resistance of the steel. However, when the Cr content is less than 0.1%, the above-described effect is not easily effectively obtained. On the other hand, when the Cr content is more than 1.0%, the weldability and the HAZ toughness of the steel are decreased. Accordingly, the Cr content is 0.1% to 1.0%. The lower limit of the Cr content is preferably more than 0.1% and more preferably 0.2%. The upper limit of the Cr content is preferably less than 1.0% and more preferably 0.8%.

Al: 0.01% to 0.10%

Aluminum (Al) combines with N to form fine Al nitrides and increases the toughness of the steel. However, when the Al content is less than 0.01%, the above-described effect cannot be effectively obtained. On the other hand, when the Al content is more than 0.10%, the Al nitrides are coarsened and the toughness of the steel is decreased. Accordingly, the Al content is 0.01% to 0.10%. The lower limit of the Al content is preferably more than 0.01% and more preferably 0.02%. The upper limit of the Al content is preferably less than 0.1%, more preferably 0.08%, and still more preferably 0.06%. The Al content in the specification represents the amount of acid-soluble Al (what is called Sol.Al).

P: 0.03% or Less

Phosphorous (P) is an impurity. P decreases the toughness of the steel. Accordingly, the P content is preferably as low as possible. Therefore, the P content is limited to 0.03% or less. The upper limit of the P content is preferably less than 0.03%, more preferably 0.015%, and still more preferably 0.012%.

S: 0.005% or Less

Sulfur (S) is an impurity. S combines with Mn to form coarse MnS, and decreases the toughness and HIC resistance of the steel. Accordingly, the S content is preferably as low as possible. Therefore, the S content is limited to 0.005% or less. The upper limit of the S content is preferably less than 0.005%, more preferably 0.003%, and still more preferably 0.002%.

Ca: 0.0005% to 0.005%

Calcium (Ca) combines with S in the steel to form CaS. The formation of CaS suppresses the production of MnS. Therefore, Ca increases the toughness and HIC resistance of the steel. However, when the Ca content is less than 0.0005%, the above-described effect cannot be effectively obtained. On the other hand, when the Ca content is more than 0.005%, the cleanliness of the steel is decreased and the toughness and HIC resistance of the steel are decreased. Accordingly, the Ca content is 0.0005% to 0.005%. The lower limit of the Ca content is preferably more than 0.0005%, more preferably 0.0008%, and still more preferably 0.001%. The upper limit of the Ca content is preferably less than 0.005%, more preferably 0.003%, and still more preferably 0.002%.

V: 0.010% to 0.040%

Vanadium (V) combines with C in the steel to form V-carbides, and increases the strength of the steel. Further, V is solid-solved in Mo carbides to form specified carbides. When V is contained, the specified carbides are not easily coarsened. When the V content is less than 0.010%, the above-described effect cannot be effectively obtained. On the other hand, when the V content is more than 0.040%, the V-carbides are coarsened. Accordingly, the V content is 0.010% to 0.040%. The lower limit of the V content is preferably more than 0.010%, and more preferably 0.02%. The upper limit of the V content is preferably less than 0.040%.

N: 0.002% to 0.007%

Nitride (N) combines with Al to form fine Al nitrides and increases the toughness of the steel. In order to obtain the above-described effect, the lower limit of the N content is preferably 0.002%. However, when the N content is excessively high, N solid-solved in the steel decreases the toughness of the steel. Further, when the N content is excessively high, the carbonitrides are coarsened and the toughness of the steel is decreased. Accordingly, the N content is 0.007% or less. The upper limit of the N content is preferably less than 0.007%, more preferably 0.006%, and still more preferably 0.005%.

The chemical composition of the seamless steel pipe according to this embodiment further contains at least one selected from the group consisting of Ti and Nb. Both the components increase the toughness of the steel and are solid-solved in Mo carbides to form specified carbides.

Ti: 0.008% or Less

Titanium (Ti) combines with N in the steel to form TiN, and suppresses the decrease in toughness of steel caused by N forming a solid solution. Further, fine TiN that is dispersedly precipitated, increases the toughness of the steel. Furthermore, Ti is solid-solved in Mo carbides to form specified carbides and suppresses coarsening of the specified carbides. As long as even a small amount of Ti is contained, the above-described effect can be obtained. When the Ti content is 0.001% or more, the above-described effect can be remarkably obtained. On the other hand, when the Ti content is more than 0.008%, TiN is coarsened and coarse TiC is formed, therefore, toughness of the steel is decreased. That is, when Ti is contained, the Ti content needs to be restricted in order to refine and disperse the nitrides and the specified carbides. The upper limit of the Ti content is 0.008% or less. The upper limit of the Ti content is preferably less than 0.008%, more preferably 0.005%, still more preferably 0.003%, and still more preferably 0.002%.

Nb: 0.02% to 0.05%

Niobium (Nb) combines with C and/or N in the steel to form fine Nb carbides, Nb nitrides, or Nb carbonitrides, and increases the toughness of the steel. Further, fine Nb is solid-solved in Mo carbides to form specified carbides, thereby suppressing coarsening of the specified carbides. When the Nb content is less than 0.02%, the above-described effect cannot be effectively obtained. Therefore, the lower limit of the Nb content when being contained is 0.02%. On the other hand, when the Nb content is more than 0.05%, the specified carbides are coarsened. Accordingly, the Nb content is preferably 0.02% to 0.05%. The lower limit of the Nb content is preferably more than 0.02%, and more preferably 0.03%. The upper limit of the Nb content is preferably less than 0.05%, and more preferably 0.04%.

The balance of the composition of the seamless steel pipe according to the embodiment includes Fe and impurities. Here, the impurities referred to herein are elements that mixedly enter from ore and scrap used as raw materials for steel, the environment of the production process, and the like.

The chemical composition of the seamless steel pipe according to the embodiment may further include at least one selected from the group consisting of Cu and Ni in place of some of Fe. Any of these elements increases the hardenability of the steel and improves the strength of the steel.

Cu: 1.0% or Less

Copper (Cu) is an optional element. Cu improves the hardenability of the steel and increases the strength of the steel. Any small amount of Cu can provide the above-described effects. When the Cu content is 0.05% or more, the above-described effect is remarkably obtained. On the other hand, when the Cu content is more than 1.0%, the weldability of the steel is decreased. Furthermore, when the Cu content is too high, the intergranular strength of the steel at a high temperature is decreased and the hot workability of the steel is decreased. Accordingly, the upper limit of the Cu content is 1.0%. The lower limit of the Cu content is preferably more than 0.05%, more preferably 0.1%, and still more preferably 0.2%.

Ni: 1.0% or Less

Nickel (Ni) is an optional element. Ni improves the hardenability of the steel and increases the strength of the steel. Any small amount of Ni content can provide the above-described effect. When the Ni content is 0.05% or more, the above-described effect is remarkably obtained. On the other hand, when the Ni content is more than 1.0%, the SSC resistance is decreased. Accordingly, the upper limit of the Ni content is 1.0%. The lower limit of the Ni content is preferably more than 0.05%, more preferably 0.1%, and still more preferably 0.2%. The upper limit of the Ni content is preferably less than 1.0%, more preferably 0.7%, and still more preferably 0.5%.

[Carbon Equivalent Ceq]

For the seamless steel pipe according to the embodiment, the carbon equivalent Ceq defined by the following Formula (1) is 0.50% to 0.58%.

$$Ceq=C+Mn/6+(Cr+Mo+V)/5+(Ni+Cu)/15 \qquad (1)$$

Here, into each of the symbols of elements in Formula (1), the amount (mass %) of the corresponding element is substituted. In the chemical composition of the seamless steel pipe according to the embodiment, in the case where an element corresponding to the symbol of the element in Formula (1) is not contained in the seamless steel pipe, "0" is substituted into the corresponding symbol of the element in Formula (1). Here, the "case where an element is not contained" referred to herein represents that the amount of the element is at the level of the impurities or lower.

In the seamless steel pipe according to the embodiment, the C content is limited. This is because that C remarkably decreases the toughness of the weld zone formed by circumferential welding. However, when the C content is too low, the high strength of steel cannot be obtained. In this embodiment, therefore, the lower limit of the carbon equivalent Ceq defined by Formula (1) is 0.50%. In this case, even when the C content is low, high strength can be obtained. More specifically, the strength grade of the seamless steel pipe can be X80 or higher according to the API standards, that is, the yield stress of the seamless steel pipe can be 550 MPa or more. On the other hand, when the carbon equivalent Ceq is too high, the hardenability of the steel becomes too high and thus the hardness of the heat affected zone (HAZ) is excessively increased. As a result, the toughness of the HAZ is decreased and the HIC resistance is also decreased. Accordingly, the upper limit of the carbon equivalent Ceq is 0.58%.

[Specified Carbide]

The seamless steel pipe according to the embodiment contains a plurality of specified carbides having a size of 20 nm or more. Here, the specified carbides represent carbides containing Mo as a main component, V, and at least one of Ti and Nb. The "Mo as a main component" represents that the Mo content in the carbide is 50 mass % or more with respect to the mass of the entire carbide. In addition, the V content is preferably 1 mass % to 50 mass % and the Ti content and the Nb content are preferably 1 mass % to 30 mass % with respect to the mass of the entire carbide.

The size of the specified carbides can be measured by the following manner. An extraction replica method is used to sample an extraction replica film from the thick portion of the seamless steel pipe. Specifically, an extraction replica film (diameter of 3 mm) is sampled from a region including the center portion of an arbitrary thick portion of the seamless steel pipe in the thickness direction, and an extraction replica film (diameter of 3 mm) is sampled from a region including a portion positioned on the inner side 1 mm away from the inner surface in the thickness direction. On each of the extraction replica films, four places (four fields of view) of arbitrary regions of 10 $\mu m^2$ are observed. That is, for one seamless steel pipe eight regions are observed. A transmission electron microscope (TEM) is used to observe the places at a magnification of 3,000 times.

From a plurality of precipitates observed in each region, carbides and carbonitrides are identified based on the electron beam diffraction pattern analysis. Further, using an energy dispersive X-ray spectroscope (EDS), the chemical compositions of each of the identified carbides and carbonitrides are analyzed to identify specified carbides. Ten specified carbides are selected from the plurality of identified specified carbides. The major axis (nm) of each of the selected specified carbides is measured. Here, the "major axis" represents the maximum of the straight lines connecting two different points at the interface between the specified carbides and the base metal. The major axes of 80 specified carbides (10 carbides×8 regions) are measured by the above-described method. The average value of the measured major axes is defined as the "size (nm) of specified carbides".

The specified carbides increase the strength of the steel. However, when the size of the specified carbide is too small, the hardness of the steel becomes too high and the HIC resistance is decreased. When the size of the specified carbide is 20 nm or less, the hardness of the steel is within an appropriate range while the strength of the steel is increased. Therefore, the HIC resistance is also increased. Specifically, the yield strength of the seamless steel pipe is 550 MPa or more (X80 grade or higher). In addition, the Vickers hardness at the position on the inner side 1 mm away from the inner surface of the seamless steel pipe (hereinafter, referred to as inner surface layer hardness) is 195 HV10 to 248 HV10. Further, the toughness of the circumferentially welded seamless steel pipe is not easily decreased excessively or the hardness is not easily excessively increased.

The upper limit of the size of the specified carbide is not particularly limited. The upper limit of the size of the specified carbide is, for example, 200 nm. The upper limit of the size is preferably 100 nm, and more preferably 70 nm.

[Production Method]

An example of a method for producing the seamless steel pipe according to this embodiment will be described. In the embodiment, a seamless steel pipe produced by hot working is cooled (air-cooled or acceleratedly cooled). Then, the cooled seamless steel pipe is quenched and tempered at a specific tempering temperature. Hereinafter, the method for producing the seamless steel pipe according to the embodiment will be described in detail.

[Production Line]

FIG. 1 is a block diagram showing an example of a production line for the seamless steel pipe according to the embodiment. Referring to FIG. 1, the production line includes a heating furnace 1, a piercing machine 2, an elongation rolling mill 3, a sizing mill 4, a holding furnace 5, a water cooling apparatus 6, a quenching apparatus 7, and a tempering apparatus 8. Between these apparatuses, a plurality of transfer rollers 10 is disposed. In FIG. 1, the quenching apparatus 7 and the tempering apparatus 8 are also included in the production line. However, the quenching apparatus 7 and the tempering apparatus 8 may be disposed so as to be separate from the production line. In other words, the quenching apparatus 7 and the tempering apparatus 8 may be disposed off-line.

[Production Flow]

Figure 2:
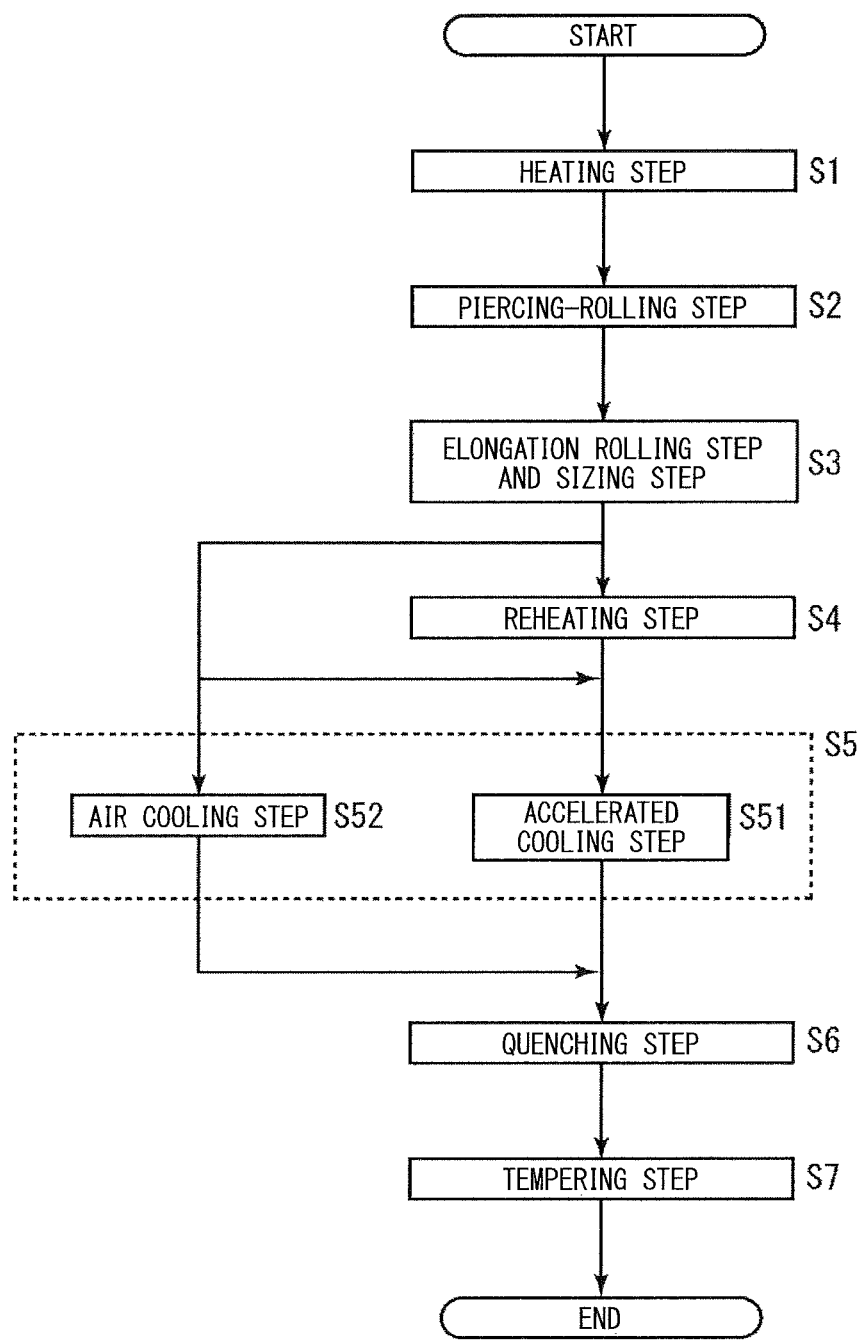
FIG. 2 is a flowchart showing a production process for the seamless steel pipe according to the present embodiment.
Figure 3:
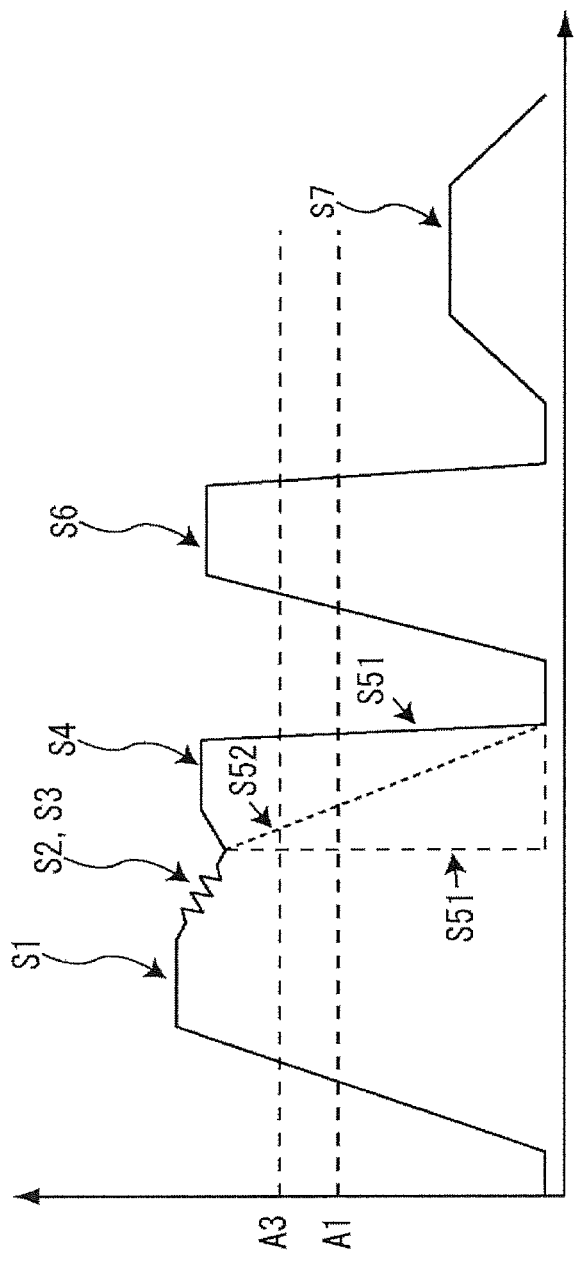
FIG. 3 is a schematic view showing the temperature of a steel material, a raw pipe, and a seamless steel pipe in each step shown in FIG. 2.

FIG. 2 is a flowchart showing a production process for the seamless steel pipe according to the embodiment. FIG. 3 is a diagram showing a change of surface temperature of work pieces (steel material, raw pipe, and seamless steel pipe) with respect to time during production. Here, A1 in the drawing represents an $A_{c1}$ point when the work pieces are heated, and represents an $A_{r1}$ point when the work pieces are cooled. In addition, A3 in the drawing represents an $A_{c3}$ point when the work pieces are heated, and represents an $A_{r3}$ point when the work pieces are cooled.

In the embodiment, the $A_{c1}$ point, $A_{c3}$ point, $A_{r1}$ point, and $A_{r3}$ point are values obtained by creating a CCT diagram of a test piece sampled from steel having a predetermined chemical composition in a formastor test and calculating the values based on the obtained CCT diagram.

Referring to FIGS. 1 to 3, in the production process, first, a steel material is heated in the heating furnace 1 (heating step: S1). The steel material is, for example, a round billet. The steel material may be produced by using a continuous casting apparatus such as a round CC. Further, the steel material also may be produced by hot-working (forging or blooming) an ingot or a slab. In this example, the explanation is continued assuming that the steel material is a round billet.

The heated round billet is hot-worked to form a seamless steel pipe (S2 and S3). Specifically, the round billet is piercing-rolled by the piercing machine 2 to form a raw pipe (piercing-rolling step: S2). Further, the raw pipe is rolled by the elongation rolling mill 3 and the sizing mill 4 to form a seamless steel pipe (elongation rolling step and sizing step: S3). Then, the seamless steel pipe produced by hot working is heated to a predetermined temperature by the holding furnace 5 as necessary (reheating step: S4). Successively, the seamless steel pipe is cooled (cooling step: S5). As the cooling method, the seamless steel pipe is cooled by water cooling (accelerated cooling) using the water cooling apparatus 6 (accelerated cooling step: S51) or the seamless steel pipe is cooled by air cooling (air cooling step: S52).

The cooled seamless steel pipe is quenched using the quenching apparatus 7 (quenching step: S6) and tempered at a specific tempering temperature using the tempering apparatus 8 (tempering step: S7). Hereinafter, each of the steps will be described in detail.

[Heating Step (S1)]

First, a round billet is heated in the heating furnace 1. The preferable heating temperature is 1100° C. to 1300° C. When the round billet is heated at a temperature in this temperature range, carbonitrides in the steel dissolve. In the case where the round billet is produced from a slab or an ingot by hot working, the heating temperature of the slab and ingot may not necessarily be 1100° C. to 1300° C. This is because when the ingot or the slab is heated, carbonitrides in the steel dissolve. The heating furnace 1 is, for example, a well-known walking beam furnace or rotary furnace.

[Piercing-Rolling Step (S2)]

The round billet is taken out of the heating furnace 1 and then the heated round billet is piercing-rolled by the piercing machine 2 to produce a raw pipe. The piercing machine 2 is provided with a plurality of inclined rolls and a plug. The plug is disposed between the inclined rolls. The preferable piercing machine 2 is a cross-type piercer. When the cross-type piercer is used, piercing can be performed at a high pipe expansion rate and thus the use of the cross-type piercer is preferable.

[Elongation Rolling Step and Sizing Step (S3)]

Next, the raw pipe is rolled. Specifically, the raw pipe is elongated and rolled by the elongation rolling mill 3. The elongation rolling mill 3 includes a plurality of roll stands disposed in series. The elongation rolling mill 3 is, for example, a mandrel mill. Successively, the elongated and rolled raw pipe is drawn and rolled by the sizing mill 4 to produce a seamless steel pipe. The sizing mill 4 includes a plurality of roll stands disposed in series. The sizing mill 4 is, for example, a sizer or a stretch reducer. Further, the elongation rolling step and the sizing step are collectively simply referred to as a rolling step in some cases.

[Reheating Step (S4)]

A reheating step (S4) is carried out as necessary. That is, the production method according to the embodiment may not include the reheating step (S4). Specifically, when water cooling is carried out by an accelerated cooling step (S51), the reheating step (S4) is carried out in a case where the temperature of the seamless steel pipe is increased before the water cooling. In the case where the reheating step is not carried out, in FIG. 2, the process proceeds from step S3 to step S5. In the case where the reheating step is not required, in FIG. 1, the holding furnace 5 does not have to be provided.

When the accelerated cooling is carried out in following step at a finishing temperature (the surface temperature of the seamless steel pipe immediately after the step of S3 ends) lower than $A_{r3}$, reheating is preferably carried out in the reheating step (S4). In the reheating step (S4), the seamless steel pipe is charged into the holding furnace 5 and is heated. The preferable heating temperature in the holding furnace 5 is 900° C. to 1100° C. The preferable soaking time is 30 minutes or less. This is because when the soaking time is too long, the carbonitrides composed of Ti, Nb, C, and N (Ti, Nb) (C, N) may be precipitated and coarsened.

In the reheating step (S4), an induction heating apparatus may be used in place of the holding furnace 5.

[Cooling Step (S5)]

The seamless steel pipe produced in step S3 or the seamless steel pipe reheated in step S4 is cooled. For the cooling, any of an accelerated cooling step (S51) and an air cooling step (S52) may be carried out. The accelerated cooling step (S51) and the air cooling step (S52) are collectively referred to as a cooling step (S5).

[Accelerated Cooling Step (S51)]

When the toughness of the seamless steel pipe is increased, the seamless steel pipe is cooled not by the air cooling step (S52), but the accelerated cooling step (S51). In the accelerated cooling step (S51), the seamless steel pipe is water-cooled (acceleratedly cooled) by the water cooling apparatus 6. The temperature (surface temperature) of the seamless steel pipe before being water-cooled is $A_{r3}$ or higher, and preferably 800° C. or higher. The $A_{r3}$ point of the seamless steel pipe having the chemical composition within the above-described range according to the embodiment is 750° C. or lower. When the temperature of the seamless steel pipe immediately before being water-cooled is lower than $A_{r3}$, ferrite is produced and quenching is not sufficient. Thus, the temperature is not preferable. When the temperature of the seamless steel pipe before being acceleratedly cooled is lower than $A_{r3}$, the seamless steel pipe is reheated in the reheating step (S4) and the temperature thereof is increased to $A_{r3}$ or higher.

The cooling rate in the accelerated cooling step is preferably 100° C./min or higher. When the cooling rate is lower than a cooling rate of 100° C./min, since ferrite is generated, the temperature is not preferable. In addition, the cooling stop temperature is preferably $A_{r1}$ or lower. At a cooling stop temperature of $A_{r1}$ or higher, the amount of residual austenite is increased and thus the temperature is not preferable. The $A_{r1}$ point of the seamless steel pipe according to the embodiment having the chemical composition within the above-described range is 550° C. or lower. The preferable cooling stop temperature is 450° C. or lower. The microstructure of the base metal (matrix) is transformed into martensite or bainite by the accelerated cooling and is refined. More specifically, a martensite lath or a bainite lath is generated in the martensite or bainite.

The configuration of the water cooling apparatus 6 used for accelerated cooling is, for example, as described below. The water cooling apparatus 6 includes a plurality of rotary rollers, a laminar water flow device, and a jet water flow device. The plurality of rotary rollers are disposed in two rows and the seamless steel pipe is provided between the plurality of rotary rollers disposed in two rows. At this time, each of the rotary rollers disposed in two rows comes into contact with the lower portion of the outer surface of the seamless steel pipe. When the rotary rollers are rotated, the seamless steel pipe is rotated around the axis thereof. The laminar water flow device is disposed above the rotary rollers, and pours water over the seamless steel pipe from above. At this time, the water poured over the seamless steel pipe forms a laminar water flow. The jet water flow device is disposed near the end of the seamless steel pipe disposed on the rotary rollers. The jet water flow device injects jet water flow toward the inside of the steel pipe from the end of the seamless steel pipe. The laminar water flow device and the jet water flow device are used to cool the outer and inner surfaces of the seamless steel pipe at the same time. Such a configuration of the water cooling apparatus 6 is particularly suitable for accelerated cooling of a thick seamless steel pipe having a thickness of 35 min or more.

The water cooling apparatus 6 may be an apparatus other than the above-described rotary rollers, laminar water flow device, and jet water flow device. For example, the water cooling apparatus 6 may be a water tank. In this case, the seamless steel pipe is immersed in the water tank and is acceleratedly cooled. Also, the water cooling apparatus 6 may include the laminar water flow device only. That is to say, the type of the water cooling apparatus 6 is not limited.

After the water cooling is stopped at the water cooling stop temperature, air cooling may be carried out until the surface temperature of the seamless steel pipe reaches room temperature. The seamless steel pipe may be cooled to room temperature by the water cooling apparatus 6.

As described above, the accelerated cooling step (S51) is effective in a case where higher toughness is obtained. However, when there is no need to obtain high toughness, in place of the accelerated cooling step (S51), the air cooling step (S52) which will be described below may be carried out.

[Air Cooling Step (S52)]

In the production process of the seamless steel pipe according to the embodiment, in place of the accelerated cooling step (S51), the air cooling (S52) may be carried out. In the air cooling step (S52), the seamless steel pipe produced in the step S3 is air-cooled. Accordingly, when the air cooling step (S52) is carried out, the reheating step (S4) may not be carried out.

In the air cooling step (S52), cooling is carried out until the surface temperature of the seamless steel pipe reaches 400° C. or lower. In the air cooling, the seamless steel pipe may be cooled to room temperature.

[Quenching Step (S6)]

The seamless steel pipe which has been subjected to the accelerated cooling step (S51) or the air cooling step (S52) is quenched. Specifically, the seamless steel pipe is heated by the quenching apparatus 7. By this heating, the metallographic microstructure of the seamless steel pipe is transformed into austenite. Then, the heated seamless steel pipe is quenched by accelerated cooling. Thereby, the metallographic microstructure of the seamless steel pipe becomes a metallographic structure which consists mainly of martensite or bainite.

In the quenching step (S6), the seamless steel pipe is heated to a temperature of the $A_{c3}$ point or higher by heating using the quenching apparatus 7. In addition, soaking is preferably carried out for 5 minutes to 90 minutes at a temperature within the aforementioned range. The Ac3 point of the seamless steel pipe according to the embodiment having the chemical composition within the above-described range is 800° C. to 900° C.

In the cooling step of the quenching step (S6), the seamless steel pipe heated to the $A_{c3}$ point or higher is quenched by accelerated cooling. The quenching start temperature is the $A_{c3}$ point or higher as described above. Further, the cooling rate during the time when the temperature of the seamless steel pipe is 800° C. to 500° C. is 5° C./sec (300° C./min) or higher. Accordingly, a uniform quenching structure can be obtained. The cooling stop temperature is the $A_{r1}$ point or lower. When the cooling stop temperature is higher than the $A_{r1}$ point, the amount of residual austenite is increased and thus the temperature is not preferable. The preferable cooling stop temperature is 450° C. or lower. Also, the seamless steel pipe may be cooled to room temperature by accelerated cooling.

[Tempering Step (S7)]

The quenched steel pipe is tempered. The tempering temperature is 660° C. to 700° C. The retaining time is preferably 10 minutes to 120 minutes. By carrying out tempering under such conditions, specified carbides having a size of 20 nm or more can be finely dispersed in the seamless steel pipe. As a result, the strength grade of the seamless steel pipe can be X80 or higher according to the API standards, that is, the yield strength of the seamless steel pipe can be 550 MPa or more. Further, since the size of the specified carbide is 20 nm or more, good toughness and HIC resistance can be obtained in the circumferentially welded HAZ.

By the above-described production processes, even for the seamless steel pipe having a thickness of 35 mm or more, excellent strength, toughness, and HIC resistance can be obtained. The above-described production method is particularly suitable for a seamless steel pipe having a thickness of 35 mm or more and is also applicable to a seamless steel pipe having a thickness of 40 mm or more. The upper limit of the thickness is not particularly limited and is typically 60 mm or less.

Examples

A plurality of seamless steel pipes having various chemical compositions were produced, and the strength, toughness, inner surface layer hardness, and HIC resistance of each of the seamless steel pipes were examined. Further, the seamless steel pipes were circumferentially welded and the toughness, hardness, and HIC resistance of the circumferential weld zone were examined.

[Examination Method]

A plurality of molten steels having the chemical compositions shown in Table 1 was produced by a 40t electric furnace. Ingots were produced from the molten steels. The ingots were hot-forged to produce round billets.

The symbol "-" in Table 1 indicates that the content is equal to or less than the measurement limit.

TABLE 1

| Steel type | Chemical composition (Unit: mass %, Balance: Fe and impurities) | | | | | | | | | | | | | | | Ceq (%) | $A_{c3}$ (° C.) | $A_{r3}$ (° C.) | $A_{r1}$ (° C.) |
|---|---|---|---|---|---|---|---|---|---|---|---|---|---|---|---|---|---|---|---|
| | C | Si | Mn | Mo | Cr | Al | P | S | Ca | V | N | Ti | Nb | Cu | Ni | | | | |
| A | 0.060 | 0.14 | 1.24 | 0.97 | 0.30 | 0.029 | 0.012 | 0.0008 | 0.0020 | 0.030 | 0.0047 | — | 0.020 | — | — | 0.527 | 895 | 695 | 550 |
| B | 0.061 | 0.11 | 1.62 | 0.57 | 0.29 | 0.035 | 0.010 | 0.0016 | 0.0019 | 0.010 | 0.0049 | 0.003 | 0.030 | — | — | 0.505 | 870 | 680 | 540 |
| C | 0.061 | 0.15 | 1.65 | 0.51 | 0.29 | 0.035 | 0.010 | 0.0016 | 0.0019 | 0.020 | 0.0049 | 0.003 | 0.030 | — | — | 0.500 | 875 | 685 | 540 |
| D | 0.070 | 0.14 | 1.80 | 0.50 | 0.30 | 0.030 | 0.010 | 0.0010 | 0.0020 | 0.040 | 0.0050 | 0.005 | — | — | 0.50 | 0.571 | 870 | 665 | 520 |
| E | 0.069 | 0.14 | 1.57 | 0.50 | 0.30 | 0.028 | 0.010 | 0.0009 | 0.0018 | 0.020 | 0.0050 | 0.003 | 0.030 | — | 0.51 | 0.529 | 875 | 670 | 530 |
| F | 0.070 | 0.13 | 1.51 | 0.50 | 0.45 | 0.032 | 0.014 | 0.0010 | 0.0012 | 0.020 | 0.0047 | 0.005 | — | 0.25 | 0.25 | 0.549 | 876 | 680 | 545 |
| G | 0.051 | 0.14 | 1.40 | 0.71 | 0.46 | 0.033 | 0.014 | 0.0008 | 0.0013 | 0.019 | 0.0054 | 0.005 | — | 0.25 | 0.25 | 0.555 | 890 | 685 | 545 |
| H | 0.047 | 0.15 | 1.70 | 0.50 | 0.43 | 0.030 | 0.012 | 0.0009 | 0.0019 | 0.020 | 0.0055 | — | 0.020 | 0.25 | 0.25 | 0.554 | 875 | 670 | 530 |
| I | 0.045 | 0.15 | 1.67 | 0.50 | 0.43 | 0.030 | 0.011 | 0.0009 | 0.0020 | 0.020 | 0.0054 | — | 0.027 | 0.25 | 0.25 | 0.547 | 875 | 670 | 532 |
| J | 0.063 | 0.15 | 1.23 | 0.67 | 0.76 | 0.024 | 0.011 | 0.0009 | 0.0015 | 0.050 | 0.0049 | 0.005 | — | — | — | 0.564 | 890 | 690 | 550 |
| K | 0.053 | 0.14 | 1.82 | 0.35 | 0.45 | 0.029 | 0.012 | 0.0008 | 0.0017 | 0.020 | 0.0047 | 0.005 | — | — | 0.46 | 0.551 | 870 | 675 | 530 |
| L | 0.058 | 0.15 | 1.60 | 0.50 | 0.30 | 0.030 | 0.010 | 0.0010 | 0.0020 | 0.030 | 0.0050 | 0.005 | — | — | — | 0.491 | 880 | 680 | 540 |
| M | 0.064 | 0.30 | 1.78 | 0.60 | 0.30 | 0.030 | 0.010 | 0.0010 | 0.0020 | 0.020 | 0.0050 | 0.005 | — | 0.35 | 0.35 | 0.591 | 870 | 660 | 520 |
| N | 0.065 | 0.19 | 2.05 | 0.70 | 0.12 | 0.032 | 0.010 | 0.0018 | 0.0024 | 0.010 | 0.0054 | 0.005 | — | — | — | 0.573 | 880 | 660 | 500 |

Each of the produced round billets was heated to 1100° C. to 1300° C. Successively, each of the round billets was piercing-rolled by the piercer to form raw pipes. Next, each of the raw pipes was elongated and rolled by the mandrel mill. Then, each of the raw pipes was drawn and rolled (sized) by the sizer to produce a plurality of seamless steel pipes. The seamless steel pipes each had a thickness of 40 mm.

Tables 2-1 and 2-2 show production conditions of each production process after sizing.

TABLE 2-1

| | | Reheating step (S4) | | Accelerated cooling step (S51) | | | Quenching step (S6) | | | | Tempering step (S7) |
|---|---|---|---|---|---|---|---|---|---|---|---|
| Test No. | Steel type | Heating temperature (° C.) | Soaking time (min) | Start temperature (° C.) | Cooling rate (° C./min) | Cooling stop temperature (° C.) | Heating temperature (° C.) | Soaking time (min) | Cooling rate (° C./min) | Cooling stop temperature (° C.) | Tempering temperature (° C.) |
| 1 | A | 950 | 10 | 930 | 300 | ≤450 | 950 | 10 | 300 | ≤100 | 670 |
| 2 | A | 950 | 10 | 930 | 300 | ≤450 | 950 | 10 | 300 | ≤100 | 650 |
| 3 | B | 950 | 10 | 900 | 300 | ≤450 | 950 | 10 | 300 | ≤100 | 665 |
| 4 | C | 950 | 10 | 900 | 300 | ≤450 | 950 | 10 | 300 | ≤100 | 675 |
| 5 | D | 920 | 10 | 900 | 300 | ≤450 | 920 | 10 | 300 | ≤100 | 660 |
| 6 | D | | | | | | 920 | 10 | 300 | ≤100 | 660 |
| 7 | E | | | | | | 920 | 10 | 300 | ≤100 | 675 |
| 8 | F | | | | | | 920 | 10 | 300 | ≤100 | 665 |
| 9 | G | | | | | | 920 | 10 | 300 | ≤100 | 665 |
| 10 | H | 950 | 10 | 900 | 300 | ≤450 | 920 | 10 | 300 | ≤100 | 665 |
| 11 | H | | | | | | 920 | 10 | 300 | ≤100 | 665 |
| 12 | I | 950 | 10 | 900 | 300 | ≤450 | 920 | 10 | 300 | ≤100 | 680 |
| 13 | I | | | | | | 920 | 10 | 300 | ≤100 | 680 |
| 14 | J | 950 | 10 | 900 | 300 | ≤450 | 920 | 10 | 300 | ≤100 | 660 |
| 15 | K | 950 | 10 | 900 | 300 | ≤450 | 920 | 10 | 300 | ≤100 | 665 |
| 16 | L | | | | | | 920 | 10 | 300 | ≤100 | 665 |
| 17 | M | | | | | | 920 | 10 | 300 | ≤100 | 665 |
| 18 | N | 950 | 10 | 900 | 300 | ≤450 | 920 | 10 | 300 | ≤100 | 660 |

* An example in which the columns of Reheating step and Accelerated cooling step are blank indicates that the steel is cooled to room temperature by air cooling after being hot-rolled.

TABLE 2-2

| | | Specific carbide | | | | | | | |
|---|---|---|---|---|---|---|---|---|---|
| Test No. | Contained element | Mo content ratio (%) | Size (nm) | YS (MPa) | TS (MPa) | 50% FATT (° C.) | Inner surface layer hardness (HV10) | CLR (%) | Surface blister (piece) |
| 1 | Mo, V, Nb | 80 | 30 | 583 | 653 | −70 | 242 | 1 | 3 |
| 2 | Mo, V, Nb | 30 | 10 | 610 | 683 | −70 | 262 | 3 | 30 |
| 3 | Mo, V, Nb | 65 | 30 | 586 | 670 | −55 | 240 | 1 | 0 |
| 4 | Mo, V, Nb | 60 | 30 | 590 | 665 | −80 | 240 | 0 | 0 |
| 5 | Mo, V, Ti | 60 | 20 | 727 | 783 | −100 | 236 | 1 | 0 |
| 6 | Mo, V, Ti | 60 | 20 | 694 | 754 | −88 | 242 | 0 | 0 |
| 7 | Mo, V, Nb | 60 | 25 | 583 | 653 | −85 | 244 | 0 | 0 |
| 8 | Mo, V, Ti | 60 | 35 | 606 | 681 | −60 | 245 | 2 | 15 |
| 9 | Mo, V, Ti | 65 | 25 | 591 | 662 | −70 | 243 | 2 | 5 |
| 10 | Mo, V, Nb | 55 | 25 | 595 | 661 | −75 | 220 | 0 | 0 |
| 11 | Mo, V, Nb | 55 | 25 | 585 | 662 | −60 | 243 | 2 | 5 |
| 12 | Mo, V, Nb | 57 | 20 | 635 | 678 | −90 | 225 | 0 | 0 |
| 13 | Mo, V, Nb | 55 | 20 | 630 | 682 | −70 | 246 | 2 | 5 |
| 14 | Mo, V, Ti | 40 | 25 | 593 | 669 | −60 | 268 | 5 | 50 |
| 15 | Mo, V, Ti | 20 | 20 | 520 | 610 | −75 | 235 | 0 | 0 |
| 16 | Mo, V, Ti | 58 | 25 | 535 | 633 | −60 | 240 | 0 | 0 |
| 17 | Mo, V, Ti | 60 | 25 | 595 | 668 | −55 | 240 | 0 | 0 |
| 18 | Mo, V, Ti | 85 | 25 | 589 | 669 | −86 | 230 | 0 | 0 |

After sizing step, some of the seamless steel pipes of test Nos. 1 to 18 were heated in the holding furnace under the conditions of the heating temperature (° C.) and soaking time (min) of the "reheating step (S4)" in Table 2-1. The blank indicates that the reheating step (S4) is not carried out.

Then, the seamless steel pipe which was subjected to the reheating step was acceleratedly cooled by water cooling. The start temperature (° C.) of the "accelerated cooling step (S51)" in Table 2-1 indicates a temperature (surface temperature, ° C.) of the seamless steel pipe after sizing or heating in the holding furnace and immediately before the accelerated cooling. The accelerated cooling rate (° C./min) at the time of accelerated cooling was as shown in the accelerated cooling rate (° C./min) of the "accelerated cooling step (S51)" in Table 2-1. The cooling stop temperature of all of the acceleratedly cooled seamless steel pipes was 450° C. or lower as shown in Table 2-1.

Among test Nos. 1 to 18, some test numbers with blanks in the start temperature, the cooling rate, and the cooling stop temperature in the column "accelerated cooling step (S51)" indicate that the seamless steel pipe was not acceleratedly cooled but air-cooled to room temperature (25° C.).

After the accelerated cooling step or the air cooling step, each of the seamless steel pipes was heated and quenched. At this time, each of the seamless steel pipes was charged into the quenching apparatus 7 and heated to the quenching temperature (° C.) in the column of heating temperature in the "quenching step (S6)" in Table 2-1. At the quenching temperature, each of the seamless steel pipes was soaked for the time (min) in the column of soaking time shown in the "quenching step (S6)". After the soaking, the seamless steel pipes were acceleratedly cooled at the cooling rate (° C./min) shown in the column of cooling rate of the "quenching step (S6)" in Table 2-1. Then, the accelerated cooling was stopped at the cooling stop temperature (° C.) shown in Table 2-1. After the accelerated cooling was stopped at the cooling stop temperature, the seamless steel pipes were air-cooled to room temperature.

After the quenching step, each of the seamless steel pipes was tempered. The tempering temperature was as shown in Table 2-1. The retaining time at the tempering temperature for each of the test numbers was 30 minutes.

The seamless steel pipes produced by the above-described production processes were subjected to the following evaluation tests.

[Yield Strength and Tensile Strength Test]

The yield strength and the tensile strength of the seamless steel pipes of each of test Nos. 1 to 18 were examined. Specifically, from each of the seamless steel pipes, a No. 12 test piece (width: 25 mm, gage length: 200 mm) specified in JIS Z 2201 was sampled along the longitudinal direction (L direction) of the seamless steel pipe. The sampled test piece was used to carry out the tensile test according to JIS Z 2241 in the atmosphere at room temperature (25° C.) to obtain yield strength (YS) and tensile strength (TS). The yield strength was obtained by the 0.5% total elongation method. The obtained yield strength (MPa) and tensile strengths (MPa) are shown in Table 2-2. The "YS" in Table 2-2 indicates the yield strength obtained by the test piece of each test number, and the "TS" indicates the tensile stress.

[Toughness Test]

The toughness of the seamless steel pipes of each of test Nos. 1 to 18 was examined. Specifically, from the central portion of the thickness of each of the seamless steel pipes, a V-notch test piece according to JIS Z 2242 was sampled perpendicularly to the longitudinal direction of the seamless steel pipe (in the T direction). The V-notch test piece was a square rod shape having a transverse cross section of 10 mm×10 mm. The depth of the V notch was 2 mm. This V-notch specimen was used to carry out the Charpy impact test according to JIS Z 2242 at various temperatures. Thus, the fracture appearance transition temperature (50% FATT) of each of the seamless steel pipes was obtained. Table 2-2 shows the 50% FATT (° C.) obtained from the test piece of each test number. The 50% FATT represents a temperature at which the ductile fracture percent is 50% on the fracture surface of the test piece.

[Inner Surface Layer Hardness Test]

The Vickers hardness test was carried out according to JIS Z 2244 at three arbitrary points on the inner side 1 mm away from the inner surface of the seamless steel pipe in the thickness direction on the transverse cross section (cross section perpendicular to the center axis) of each of the seamless steel pipes of test Nos. 1 to 18. The test force F in the Vickers hardness test was 10 kgf (98.07 N). The obtained average value of the values of the three points was defined as the inner surface layer hardness (HV10) of the seamless steel pipe of the test number. The obtained inner surface layer hardness is shown in Table 2-2.

[Measurement Test of Size of Specified Carbide]

The size (nm) of the specified carbide was obtained by the above-described method on the transverse cross section of each of the seamless steel pipes of test Nos. 1 to 18. When the specified carbides were specified, elements (Mo, V, Ti, and Nb) contained in the specified carbides were also identified. The size (nm) of the specified carbide and the identified elements in the carbides are shown in Table 2-2.

[HIC Resistance Test of Base Metal]

The HIC resistance of the seamless steel pipes of test Nos. 1 to 18 was examined. Specifically, from each of the seamless steel pipes, a test piece including the inner surface of the seamless steel pipe, a test piece including the thickness center, and a test piece including the outer surface were each sampled. That is, three test pieces were sampled from each of the seamless steel pipes. The thickness of each test piece was 30 mm, the width (in the circumferential direction) was 20 mm, and the length was 100 mm. According to the National Association of Corrosion Engineers (NACE) TM0284-2003, the HIC resistance of each test piece was evaluated. The test bath in which the test pieces were immersed was an aqueous solution of 5% common salt+ 0.5% acetic acid at room temperature in which hydrogen sulfide gas of 1 atm was saturated.

After 96 hours elapsed after immersion, each test piece was cut into three equal pieces in the longitudinal direction. The cross section at this time was a cross section of thickness×width (in the circumferential direction) of the test piece. The cut test piece was used to obtain a crack length ratio CLR (=crack length (mm)/width (mm) of test piece). The maximum value in the CLR of the aforementioned three test pieces sampled from each steel pipe was defined as the crack length ratio CLR of the test piece. The obtained crack length ratio CLR is shown in Table 2-2.

Further, regarding the test piece which was subjected to the HIC resistance test, an ultrasonic test (UT) was carried out on the surface of the test piece including the inner surface of the seamless steel pipe, corresponding to the inner surface of the seamless steel pipe, (20 mm×100 mm) and it was checked whether or not a blister (swelling due to cracks near the surface) was present and the number of blisters generated in the test piece was counted. The number of blisters is shown in Table 2-2.

[Examination of Toughness of Circumferential Weld Zone]

A circumferential welding test was carried out on the seamless steel pipes of test Nos. 3, 5, 9, 12, 17, and 18. Specifically, each seamless steel pipe of the concerned test number was cut in the central portion in the longitudinal direction. The cut portion was subjected to edge preparation to take a longitudinally sectioned shape shown in FIG. 4. Under the welding conditions shown in Table 3, the cut portions of the two cut-off seamless steel pipes were circumferentially welded to each other.

TABLE 3

Figure 4:
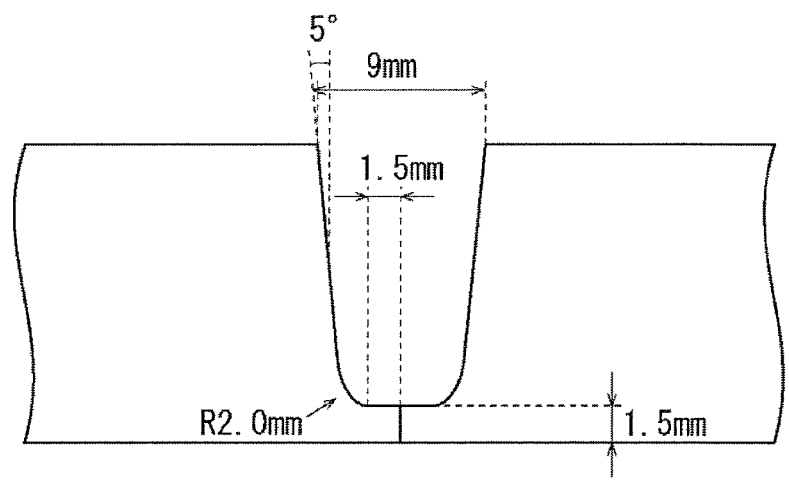
FIG. 4 is a cross sectional view showing a groove shape of a seamless steel pipe at the time when a circumferential weld zone toughness examination is carried out in an example.

| Groove shape | As shown in FIG. 4 |
|---|---|
| Preheating | Not done |
| Welding heat input | 1.5 kJ/mm |
| Post-welding heat treatment (PWHT) | 680° C. × 5 minutes |

From each of the circumferentially welded seamless steel pipes, a Charpy V-notch test piece including a weld zone (including weld metal, heat affected zone, and base metal) was sampled in the longitudinal direction of the seamless steel pipe (L direction). Specifically, from each of the seamless steel pipes, three test pieces, in which a V notch is disposed on the fusion line (FL) in which the toughness is easily deteriorated in the heat affected zone (HAZ), were sampled (hereinafter, referred to as a FL test piece), and further, three specimens, in which the V notch is disposed in the two-phase zone HAZ (hereinafter, referred to as "V.HAZ test piece"), were sampled (hereinafter, referred to as a V.HAZ test piece). Here, the two-phase zone HAZ is a portion in which the base metal is heated to the two-phase zone in the HAZ by welding heat (that is, a portion heated at a temperature within a transformation point range of $A_{c1}$ to $A_{c3}$) and also represents a portion having structures of ferrite and martensite at room temperature.

The sampled specimens were used to carry out the Charpy test according to JIS Z 2242 at a test temperature of −30° C.

to obtain absorbed energy. The lowest value of three absorbed energy values obtained from each test number was defined as the absorbed energy in the FL test piece and the V.HAZ test piece of each test number. The absorbed energy obtained by the test is shown in Table 4.

TABLE 4

| Test No. | Steel | Absorbed energy | | Fusion line hardness (HV) | HIC resistance |
|---|---|---|---|---|---|
| | | FL test piece (J) | V.HAZ test piece (J) | | |
| 3 | B | 250 | 270 | 245 | N |
| 5 | D | 150 | 250 | 255 | N |
| 9 | G | 200 | 200 | 247 | N |
| 12 | I | 250 | 290 | 242 | N |
| 17 | M | 80 | 60 | 289 | F |
| 18 | N | 170 | 220 | 280 | F |

[Circumferential Weld Zone Hardness Test]

Figure 5:
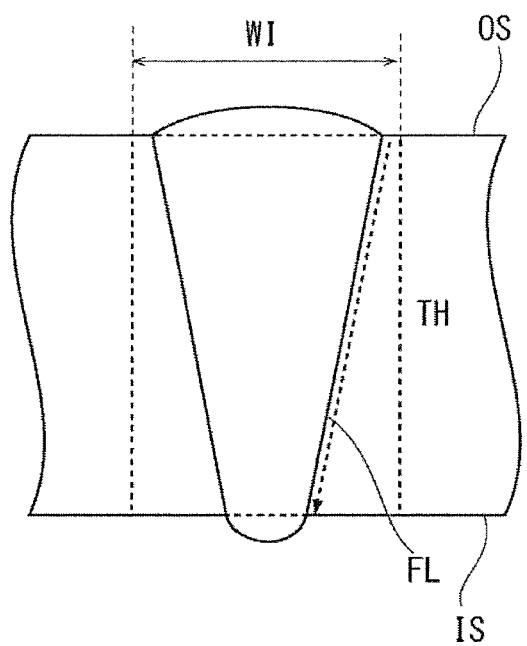
FIG. 5 is a schematic view illustrating a Vickers hardness test piece sampled from a circumferential weld zone in an example.

From each of the circumferentially welded seamless steel pipes, as shown in the region indicated by a broken line in FIG. 5, a micro test piece including a weld zone (thickness TH=40 mm, width WI=20 mm, length 20 mm) was sampled. In FIG. 5, OS refers to an outer surface and IS refers to an inner surface.

The cross section of the thickness TH and the width WI (hereinafter, referred to as an observation surface) of the micro test piece was mirror-polished. A nital etching solution was used to exhibit a metallographic structure on the mirror-polished observation surface. Then, in a range from an inner side 1 mm away from the outer surface OS to an inner side 1 mm away from the inner surface IS along the fusion line FL, at intervals of 1 mm, the Vickers hardness test was carried out according to JIS Z 2244. As a result, the hardness of 38 points in each micro test piece was measured. The test force F in the Vickers hardness test was 9.8 N. The largest value of the obtained hardness values of 38 points was defined as the hardness (HV) of the fusion line of the test piece.

[Test of HIC Resistance of Circumferential Weld Zone]

Figure 6:
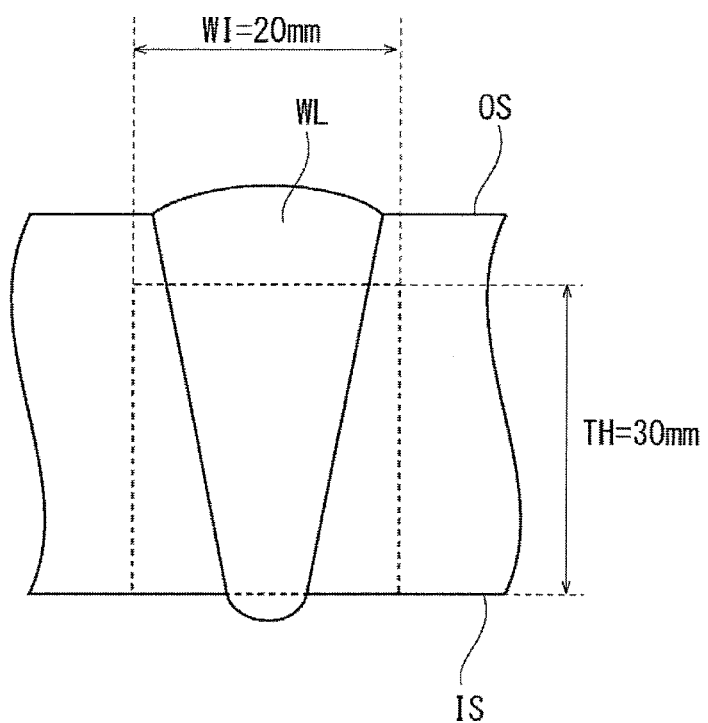
FIG. 6 is a schematic view illustrating a square test piece sampled from a circumferential weld zone in an example.

As shown in FIG. 6, from each of the circumferentially welded seamless steel pipes, a square test piece including an inner surface IS and a weld zone WL (thickness TH=30 mm, width WI=20 mm, length=100 mm) was sampled. The square test piece was immersed in the same test bath as in the above-described HIC resistance test of the base metal for 96 hours. The square test piece was taken out from the test bath and an ultrasonic test was carried out from a direction perpendicular to the fusion line FL to examine where or not HIC was present. The test results are shown in Table 4. "N" in the Table 4 indicates that HIC was not observed. "F" indicates that HIC was observed.

[Examination Results]

Referring to Tables 1, 2-1, and 2-2, for the seamless steel pipes of test Nos. 1 and 3 to 13, the chemical composition was within the range of the present invention, and the carbon equivalent was 0.50% or more. Therefore, the yield strength of each of the test numbers was 550 MPa or more, corresponding to the strength grade of X80 or higher according to the API standards. The 50% FATT of each of the test numbers was −50° C. or lower, that is, the seamless steel pipes had excellent toughness. Further, the size of the specified carbide of the test numbers was 20 nm or more. Therefore, the inner surface layer hardness was 248 HV10 or less. Thus, the crack length ratio CLR was low and the number of blisters generated was small.

When test Nos. 5 and 6 were compared, the 50% FATT of test No. 5 which was subjected to accelerated cooling was lower than that of test No. 6, and was excellent. In the same manner, when test Nos. 10 and 11, and 12 and 13 were compared, the 50% FATT of test Nos. 10 and 12 was excellent compared to test Nos. 11 and 13. That is, as long as the seamless steel pipes were made of the same type of steel, excellent toughness was obtained in a case where the accelerated cooling was carried out.

Further, referring to Table 4, the absorbed energy in the circumferential weld zones of all of test Nos. 3, 5, 9, and 12 exceeded 100 J. The hardness of the fusion line of each of the test numbers was low. Therefore, even in the weld zone, excellent HIC resistance was exhibited.

On the other hand, for test No. 2, as shown in Table 2-1, the tempering temperature was too low. Therefore, the size of the specified carbide was less than 20 nm. Thus, the inner surface layer hardness of test No. 2 was excessively increased and exceeded 248 HV10. In addition, the crack length ratio CLR was high and the number of blisters was also large. That is, the HIC resistance was low.

For test No. 14, the V content was too high. Therefore, the inner surface layer hardness was excessively increased and exceeded 248 HV10. The crack length ratio CLR was high and the number of blisters was also large.

For test No. 15, the Mo content was too low. Therefore, the yield strength was less than 550 MPa.

For test No. 16, the carbon equivalent Ceq was too low. Therefore, the yield strength was less than 550 MPa.

For test No. 17, the carbon equivalent Ceq was too high. Therefore, as shown in Table 4, the hardness of the fusion line was excessively increased, the absorbed energy was low, and HIC occurred in the HAZ of the weld zone.

For test No. 18, the Mn content was too high. Therefore, as shown in Table 4, the hardness of the fusion line was excessively increased and HIC occurred in the HAZ of the weld zone.

The embodiment of the present invention has been described above. However, the above-described embodiment is merely an illustration for carrying out the present invention. Therefore, the present invention is not limited to the above-described embodiment, and the present invention can be applied by appropriately changing or modifying the above-described embodiment without departing from the spirit and scope of the present invention.

INDUSTRIAL APPLICABILITY

According to the present invention, it is possible to provide the seamless steel pipe having high strength and excellent HIC resistance and having excellent HIC resistance of the HAZ even when being circumferentially welded.

BRIEF DESCRIPTION OF THE REFERENCE SYMBOLS

1 HEATING FURNACE
2 PIERCING MACHINE
3 ELONGATION ROLLING MILL
4 SIZING MILL
5 HOLDING FURNACE
6 WATER COOLING APPARATUS
7 QUENCHING APPARATUS
8 TEMPERING APPARATUS
FL FUSION LINE
IS INNER SURFACE
OS OUTER SURFACE

The invention claimed is:

1. A seamless steel pipe comprising, as a chemical composition, by mass %:
C: 0.02% to 0.10%;
Si: 0.05% to 0.5%;
Mn: 1.0% to 2.0%;
Mo: 0.5% to 1.0%;
Cr: 0.1% to 1.0%;
Al: 0.01% to 0.10%;
P: 0.03% or less;
S: 0.005% or less;
Ca: 0.0005% to 0.005%;
V: 0.010% to 0.040%;
N: 0.002% to 0.007%;
at least one selected from the group consisting of Ti: 0.008% or less and Nb: 0.02% to 0.05%; and
a balance comprising Fe and impurities,
wherein a carbon equivalent Ceq defined by the following Formula (1) is 0.50% to 0.58%, and
specified carbides containing Mo at a ratio of 50 mass % or more, V, and at least one selected from the group consisting of Ti and Nb, and having a size defined by an average value of major axes of 20 nm or more are contained, $$Ceq = C + Mn/6 + (Cr+Mo+V)/5 + (Ni+Cu)/15 \quad (1)$$

here, into each of the symbols of elements in the Formula (1), the amount of a unit mass % of a corresponding element is substituted, and in the case where an element corresponding to the symbol of the element is not contained, "0" is substituted into the corresponding symbol of the element,
wherein a yield strength is 550 MPa or more, and a Vickers hardness at a position on an inner side 1 mm away from an inner surface is 248 HV10 or less.

2. The seamless steel pipe according to claim 1, further comprising
at least one selected from the group consisting of Cu: 1.0% or less and Ni: 1.0% or less in place of some of Fe.

3. The seamless steel pipe according to claim 2,
wherein the seamless steel pipe is produced by a process including a quenching and a tempering at 660° C. to 700° C.

4. The seamless steel pipe according to claim 1,
wherein the seamless steel pipe is produced by a process including a quenching and a tempering at 660° C. to 700° C.

5. The seamless steel pipe according to claim 1, wherein the size of the specified carbides is 20 nm to 70 nm.

6. The seamless steel pipe according to claim 1, wherein a tensile strength is 653 MPa or more.

* * * * *